United States Patent
Liu et al.

(10) Patent No.: US 11,360,455 B1
(45) Date of Patent: Jun. 14, 2022

(54) ERROR COMPENSATION SYSTEM AND METHOD FOR NUMERICAL CONTROL (NC) MACHINE TOOL BASED ON ITERATIVE LEARNING CONTROL

(71) Applicant: Guangdong Ocean University, Zhanjiang (CN)

(72) Inventors: Huanlao Liu, Zhanjiang (CN); Yulin Wang, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 17/582,229

(22) Filed: Jan. 24, 2022

Related U.S. Application Data

(63) Continuation of application No. PCT/CN2021/132311, filed on Nov. 23, 2021.

(30) Foreign Application Priority Data

Mar. 19, 2021 (CN) .......................... 202110296461.8

(51) Int. Cl.
*G05B 19/404* (2006.01)
*G05B 19/416* (2006.01)
(Continued)

(52) U.S. Cl.
CPC ............ *G05B 19/404* (2013.01); *G05B 11/42* (2013.01); *G05B 19/251* (2013.01);
(Continued)

(58) Field of Classification Search
None
See application file for complete search history.

(56) References Cited

U.S. PATENT DOCUMENTS

2002/0156541 A1* 10/2002 Yutkowitz .............. G05B 11/42
700/28
2010/0198371 A1 8/2010 Takagi

FOREIGN PATENT DOCUMENTS

CN 101716730 A 6/2010
CN 102323790 A 1/2012
(Continued)

OTHER PUBLICATIONS

Liu Huanlao, Li Xiaoli, Su Miaojing, Wang Yulin and Liu Can; New Research Field for CNC Machine Tool Error Compensation: Dynamic Characters of Volumetric Error; Tool Engineering, 2019, 11, 8-11; College of Mechanical and Power Engineering,Guangdong Ocean University,Zhanjiang,Guangdong 524048,China.

(Continued)

*Primary Examiner* — Ryan A Jarrett

(57) ABSTRACT

An error compensation system for a numerical control (NC) machine tool based on iterative learning control, including a trajectory generating module, a down-sampling module, a position controller, a first holder, a velocity-loop iterative learning controller, a velocity controller, a second holder and a control plant. The trajectory generating module is configured to generate a desired trajectory command including a first sampling command. The first sampling command is transmitted to the down-sampling module and the velocity-loop iterative learning controller. The first sampling command is down-sampled through the down-sampling module to obtain a second sampling command. The velocity-loop iterative learning controller is configured to receive the first sampling command, and obtain a first sampling error compensation sequence according to a first sampling error sequence and a first sampling error compensation sequence of a previous iteration machining process stored therein. An error compensation method is also provided herein.

7 Claims, 12 Drawing Sheets

(51) Int. Cl.
*G05B 11/42* (2006.01)
*G05B 23/02* (2006.01)
*G05B 19/25* (2006.01)

(52) U.S. Cl.
CPC ..... *G05B 19/4163* (2013.01); *G05B 23/0254* (2013.01); *G05B 2219/42256* (2013.01)

(56) References Cited

FOREIGN PATENT DOCUMENTS

| | | |
|---|---|---|
| CN | 102393677 A | 3/2012 |
| CN | 104834219 A | 8/2015 |
| CN | 106527347 A | 3/2017 |
| CN | 110018669 A | 7/2019 |
| CN | 110703693 A | 1/2020 |
| CN | 110989495 A | 4/2020 |
| WO | 2016073010 A1 | 5/2016 |

OTHER PUBLICATIONS

Liang Jianzhi, Xie Xiangqiang, Yang Ming, Li Tingyan, Qin, Yongzhen; Model-free adaptive iterative learning control of CNC machine tool position servo system. Machine Tool&Hydraulies, 2020, 48(13):124-128.

* cited by examiner

ERROR COMPENSATION SYSTEM AND METHOD FOR NUMERICAL CONTROL (NC) MACHINE TOOL BASED ON ITERATIVE LEARNING CONTROL

CROSS-REFERENCE TO RELATED APPLICATIONS

This application is a continuation of International Patent Application No. PCT/CN2021/132311, filed on Nov. 23, 2021, which claims the benefit of priority from Chinese Patent Application No. 202110296461.8, filed on Mar. 19, 2021. The content of the aforementioned application, including any intervening amendments thereto, is incorporated herein by reference in its entirety.

TECHNICAL FIELD

This application relates to error compensation of numerical control (NC) machine tools, and more specifically to an error compensation system and method for a NC machine tool based on iterative learning control.

BACKGROUND

The precision control of numerical control (NC) machine tools is enabled based on a complex servo control system. Considering the thermal error, geometric error, and uncertainty of friction model and dynamic model, the simple proportional-integral-derivative (PID) control strategy and conventional error compensation strategy cannot reach the precision control of a NC platform. As an important part of high precision manufacturing, the NC machine tools are generally applied to a certain process to repeatedly produce and process the same part during the stage of large-scale production. If a control strategy of processing a single part is continuously adopted, the machining error will repeatedly occur.

A typical control system of a NC machine tool is structurally shown in FIG. 1, where the control plant is a combination of a motor and a mechanical system; $r_d$ is a reference input of the motor position after velocity planning and interpolation; and y is the actual output of the system. The controller has a typical three-loop control structure consisting of a current loop, a velocity loop and a position loop from the inside out, where the current controller and the velocity controller generally adopt the proportional-integral (PI) control algorithm, while the position controller often adopt the P or PD control algorithm. Considering the bandwidth of different control loops and the cost constraint, the velocity controller of a commercial product is configured to work at a high sampling rate, while the position controller is configured to operate at a low sampling rate. For example, the sampling rate of the position controller is set at MHz, while the sampling rate of the velocity controller is set at NMHz (for example, N=4 and M=1000). However, in this case, even if the same machining path is executed, the control signal will not be modified and improved on the premise of knowing the past data.

The iterative learning control (ILC) algorithm is a very effective error compensation method, where the current machining operation can learn from the past machining errors, so that the error signal that appears repeatedly during the batch operation is corrected. Currently, the ILC algorithm has been extensively used in industrial robots, injection molding machines, lithography machines and NC machine tools. Chinese Patent publication No. 106527347A, published on Mar. 22, 2017, disclosed a self-learning error correction system and method for NC machine tools, where the inner position-loop iterative learning controller performs a real-time learning control. When applying repetitive position commands, the output is allowed to follow the input to correct an undesirable control signal based on a deviation between an output trajectory and a desired trajectory to generate a new control signal, so that the tracking performance of the system can be improved. Moreover, the system has memory and experience correction functions, effectively reducing the error between the output trajectory and the desired trajectory. By designing an iterative learning controller, disturbance observer and variable-gain compensation strategy, the tracking of the desired trajectory and the suppression of disturbance during the machining operation are enabled. This method realizes the self-learning function of the NC system by accumulating error experience and self-correcting errors in the repeated machining operation. However, the introduced iterative learning control strategy does not consider the actual sampling rate, and most iterative learning control methods can only realize the error compensation of the position error signal under a low sampling rate (such as MHz) in the position loop. However, the oscillation effect between the sampling points cannot be reflected under a low sampling rate, which will result in the loss of some frequency characteristics and the aliasing of the error signal, failing to enable the satisfactory error compensation effect.

SUMMARY

In order to solve the problems that the existing error compensation methods based on iterative learning control mostly have a low sampling rate and ignore the diversity of actual frequency characteristics, causing a poor actual error compensation result, the present disclosure provides an error compensation system and method for a numerical control (NC) machine tool based on iterative learning control, which can obtain a position error signal at a high sampling rate under a multi-sampling rate architecture to perform a fast error compensation at a high sampling rate and improve the control precision of the NC machine tool.

The technical solutions of the present disclosure are described as follows.

In a first aspect, this application provides an error compensation system for a numerical control (NC) machine tool based on iterative learning control, comprising:
  a trajectory generating module;
  a down-sampling module;
  a position controller;
  a first holder;
  a velocity-loop iterative learning controller;
  a velocity controller;
  a second holder; and
  a control plant;
  wherein the control plant comprises a motor and a mechanical transmission module; the trajectory generating module is configured to generate a desired trajectory command; the desired trajectory command comprises a first sampling command; the first sampling command is configured to be transmitted to the down-sampling module and the velocity-loop iterative learning controller; the first sampling command is down-sampled by the down-sampling module to obtain a second sampling command; a sampling rate of the first sampling command is larger than a sampling rate of the second sampling command; the velocity-loop iterative learning controller is configured to receive the first sampling command; the velocity-loop iterative learning controller is also configured to obtain a first sampling error compensation according to a first sampling error sequence and a first sampling error compensation sequence of a previous iteration machining process stored in the velocity-loop iterative learning controller; the velocity-loop iterative learning controller comprises a memory and an iterative learning controller, and the first sampling error sequence of the previous iteration machining process of the NC machine tool is expressed as $e_{j-1}$; the first sampling command is expressed as $r_f$; the first sampling error sequence $e_{j-1}$ is a difference between the first sampling command $r_f$ and a displacement y of a sliding table of the NC machine tool; the first sampling error compensation sequence is expressed as $u_{j-1}$; the memory is configured to store the first sampling error sequence $e_{j-1}$ and the first sampling error compensation sequence $u_{j-1}$ of the previous iteration machining process of the sliding table; after the first sampling error sequence $e_{j-1}$ and the first sampling error compensation sequence $u_{j-1}$ of $(j-1)^{th}$ iteration are input to the iterative learning controller, the iterative learning controller is configured to obtain the first sampling error compensation sequence $u_j$ of $j^{th}$ iteration through iterative learning algorithm using a proportion-derivation (PD) method, expressed as:

$$u_j = Q\left(u_{j-1} + \Gamma_p e_{j-1} + \Gamma_d \frac{de_{j-1}}{dt}\right); \quad (1)$$

Wherein j is the number of iterations; $\Gamma_p$ and $\Gamma_d$ respectively represent an iterative learning gain; Q represents a low-pass filtering process; $e_{j-1}$ is the first sampling error sequence; the position controller is configured to receive a difference between the second sampling command output from the down-sampling module and the displacement of the sliding table of the NC machine tool, and output a velocity control signal, the velocity control signal is held by the first holder, and input to the velocity controller after compared with real-time velocity of the sliding table of the NC machine tool; a mathematical realization expression of the first holder is shown as follows:

$$H_u = H^N S_u^N;$$

wherein $H^N$ represents the second holder, which is configured as a zero-order holder; $S_u^H$ represents an up-sampling process; and the zero-order holder is expressed as:

$$H^N = \sum_{f=0}^{N} z^{-f};$$

the up-sampling process $S_u^N$ is expressed as:

$$S_u^N : u[n] \to u'[n]$$
$$u'[n] = \begin{cases} u\left[\frac{n_1}{N}\right], & \text{when } n_i \in n\frac{n_i}{N} \in Z \\ 0 \end{cases};$$

wherein Z is a time-shift operator; the velocity controller is configured to output a current signal; the current signal is configured to be superimposed on the first sampling error compensation sequence and transmitted to the second holder; the second holder is configured to drive the motor to rotate and then drive the mechanical transmission module to move, such that the mechanical transmission module drives the sliding table of the NC machine tool to move to output an actual displacement of the sliding table of the NC machine tool.

In an embodiment, the second sampling command is expressed as $r_s$; the second sampling command $r_s$ is obtained from the first sampling command $r_f$ by down-sampling through the down-sampling module, and a down-sampling process $S_d^N$ is expressed as:

$$S_d^N : r_f[n] \to r_s[n], r_s[n] = r_f[Nn];$$

wherein N and n respectively represent a positive integer, and the number of data points of the first sampling command $r_f$ is N times the number of data points of the second sampling command $r_s$.

In an embodiment, the first sampling error sequence $e_{j-1}$ and the first sampling error compensation sequence $u_{j-1}$ of previous iteration are input to the iterative learning controller, the iterative calculation performed by the iterative learning controller to obtain the first sampling error compensation $u_j$ of current iteration is performed off line.

In an embodiment, the position controller is configured to work at a sampling rate corresponding to the second sampling command; an input of the position controller is the difference between the second sampling command $r_s$ and the displacement y of the sliding table of the NC machine tool; the motor of the sliding table of the NC machine tool is equipped with an encoder displacement detecting module; and the encoder displacement detecting module is configured to detect an angular displacement of the motor and calculate the corresponding displacement y of the sliding table of the NC machine tool.

In an embodiment, the error compensation system of the NC machine tool further comprises a velocity estimator; and the velocity estimator is configured to estimating a real-time velocity of the sliding table of the NC machine tool in real time.

The present disclosure further provides an error compensation method based on the error compensation system, comprising:

(S1) generating, by a trajectory generating module, a desired trajectory command comprising a first sampling command;

transmitting the first sampling command to a down-sampling module and a velocity-loop iterative learning controller;

down-sampling, by the down-sampling module, the first sampling command to obtain a second sampling command; and receiving, by the velocity-loop iterative learning controller, the first sampling command;

(S2) setting the number of machining tasks of the NC machine tool;

initializing a gain parameter of the error compensation system; and clearing an error compensation of the NC machine tool;

(S3) allowing the NC machine tool to perform a first machining operation; and storing a first sampling error sequence and a first sampling error compensation sequence of the first iteration machining operation in the velocity-loop iterative learning controller;

(S4) iteratively calculating, by the velocity-loop iterative learning controller, a first sampling error compensation;

(S5) inputting a difference between the second sampling command and an actual displacement of a sliding table of the NC machine tool to a position controller;

outputting, by the position controller, a velocity control signal; and holding, by a first holder, the velocity control signal followed by inputting to velocity controller after compared with velocity a real-time velocity of the sliding table of the NC machine tool;

(S6) outputting, by the velocity controller, a current signal;

superimposing the current signal with the first sampling error compensation followed by transmitting to a second holder; and driving, by the second holder, a motor to rotate to drive a mechanical transmission module to move, so that the mechanical transmission module drives the sliding table of the NC machine tool to move to output an actual displacement of the sliding table of the NC machine tool; and (S7) determining whether the number of actual machining tasks of the NC machine tool reaches the number of machining tasks set in step (S2);

if yes, ending;

otherwise, returning to step (S4).

In an embodiment, the low-pass filtering process is performed with an IIR-type low-pass filter using a non-causal method through steps of:

filtering items in a bracket of equation (1);

reversing a filtering result followed by another filtering; and reversing a filtering result to obtain a result of an entire low-pass filtering to process.

Compared to the prior art, the present disclosure has the following beneficial effects.

The error compensation system and method provided herein are designed based on a multi-sampling rate architecture commonly used in engineering, where a trajectory generating module is configured to generate a desired trajectory command. A position loop is formed before the error compensation system of a sliding table of the NC machine tool outputs a position feedback to a position controller; a motor and a mechanical transmission module are configured as controlled; and a velocity loop is formed before a velocity feedback is output to a velocity controller. The error compensation is injected to the velocity loop by the control method provided herein, such that the control system can be applied to the repetitive machining operation of the NC machine tool. A position error signal can be acquired at a high sampling rate under a multi-sampling rate architecture to perform a fast error compensation at a high sampling rate. Compared with the conventional method in which the slow error compensation is injected into the position loop, the control method provided herein avoids the problem that the slow error compensation obtained by the traditional position-loop iterative learning control strategy is only a sub-optimal solution, and enhances the control precision of the NC machine tool.

DETAILED DESCRIPTION OF EMBODIMENTS

Figure 1:
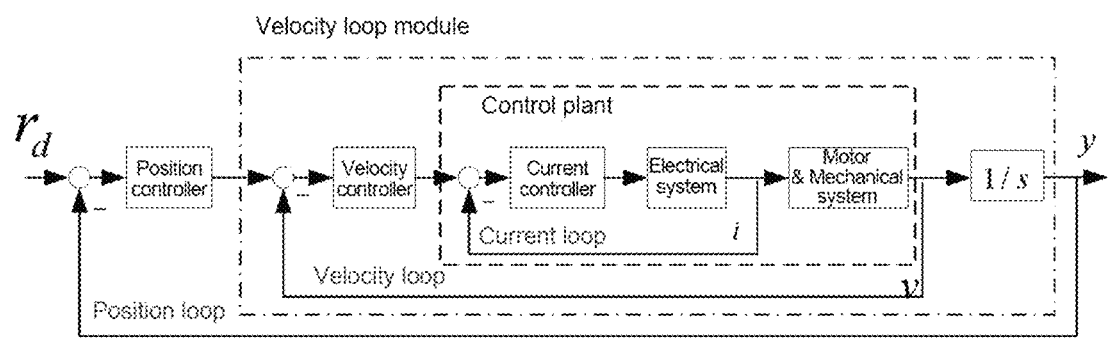
FIG. 1 is a block diagram of a structure of a traditional error compensation system for a numerical control (NC) machine tool.

The accompanying drawings provided herein are merely illustrative, and are not intended to limit the scope of the present disclosure. In order to better illustrate the embodiments of the disclosure, some parts may be omitted, enlarged or reduced, which do not represent the actual size. For those skilled in the art, it is understandable that some known contents in the drawings may be omitted. The description of the positional relationship in the drawings is only illustrative, and cannot be understood as a limitation of the present disclosure. The disclosure will be described completely and clearly below with reference to the accompanying drawings and embodiments to make the object, technical solutions, and beneficial effects of the present disclosure clearer.

Embodiment 1

Figure 2:
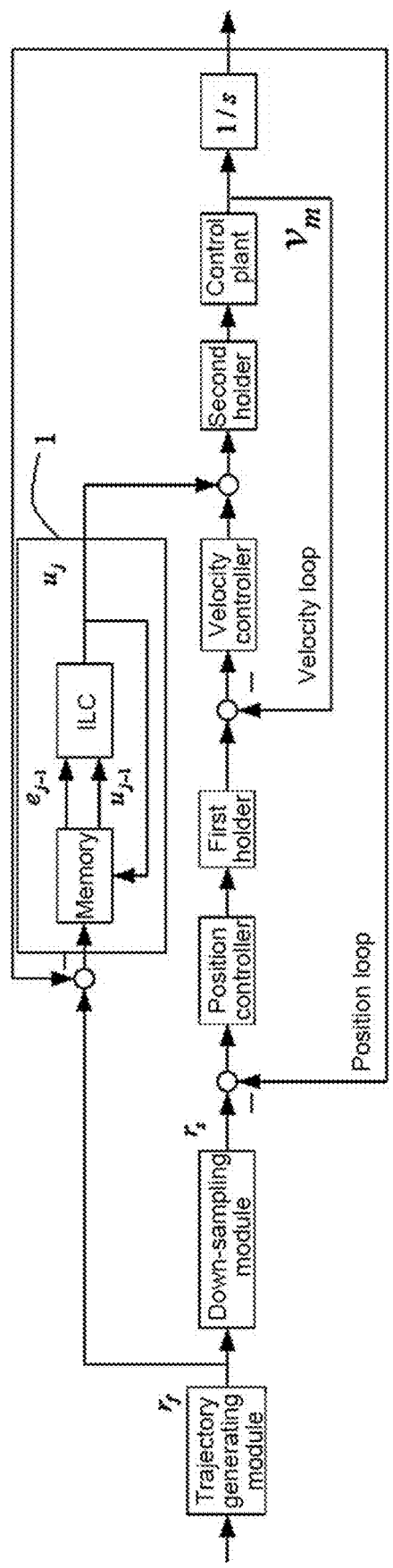
FIG. 2 is a block diagram of a structure of a fast error compensation system for a NC machine tool based on iterative learning control according to an embodiment of the present disclosure.

An error compensation system provided herein for a numerical control (NC) machine tool based on iterative learning control is structurally illustrated in FIG. 2, which includes a trajectory generating module, a down-sampling module, a position controller, a first holder, a velocity-loop iterative learning controller, a velocity controller, a second holder and a control plant. The control plant includes a motor and a mechanical transmission module. In FIG. 2, the velocity-loop iterative learning controller is marked as 1.

The trajectory generating module is configured to generate a desired trajectory command. The desired trajectory command includes a first sampling command. The first sampling command is configured to be transmitted to the down-sampling module and the velocity-loop iterative learning controller. The first sampling command is down-sampled by the down-sampling module to obtain a second sampling command. A sampling rate of the first sampling command is larger than a sampling rate of the second sampling command. The velocity-loop iterative learning controller is configured to receive the first sampling command. The velocity-loop iterative learning controller is also configured to obtain a first sampling error compensation according to a first sampling error sequence and a first sampling error compensation sequence of a previous iteration machining process stored in the velocity-loop iterative learning controller. The velocity-loop iterative learning controller includes a memory and an iterative learning controller. As shown in FIG. 2, the iterative learning controller is represented as ILC, and the first sampling error sequence of the previous iteration machining process is expressed as $e_{j-1}$. The first sampling command is expressed as $r_f$. The first sampling error sequence $e_{j-1}$ is a result of difference between the first sampling command $r_f$ and a displacement y of a sliding table of the NC machine tool. The first sampling error compensation sequence is expressed as $u_{j-1}$. The memory is configured to store the first sampling error sequence $e_{j-1}$ and the first sampling error compensation sequence $u_{j-1}$ of the previous iteration machining process of the sliding table of the NC machine tool. After the first sampling error sequence $e_{j-1}$ and the first sampling error compensation sequence $u_{j-1}$ are input to the iterative learning controller, the iterative learning controller is configured to obtain the first sampling error compensation sequence $u_j$ of current iteration through iterative calculation using a proportional-derivative (PD) method, expressed as:

$$u_j = Q\left(u_{j-1} + \Gamma_p e_{j-1} + \Gamma_d \frac{de_{j-1}}{dt}\right); \quad (1)$$

where j is the number of iterations; $\Gamma_p$ and $\Gamma_d$ respectively represent an iterative learning gain; Q represents a low-pass filtering process; $e_{j-1}$ is the first sampling error sequence. The position controller is configured to receive a difference between the second sampling command output by the down-sampling module and the displacement of the sliding table of the NC machine tool and output a velocity control signal, and the velocity control signal is held by the first holder, and input to the velocity controller after compared with real-time velocity of the sliding table of the NC machine tool. A mathematical realization expression of the first holder is shown as follows:

$$H_u = H^N S_u^N;$$

where $H^N$ represents the second holder, which is configured as a zero-order holder; $S_u^N$ represents an up-sampling process; and the zero-order holder is expressed as:

$$H^N = \sum_{f=0}^{N} z^{-f}.$$

The up-sampling process $S_u^N$ is expressed as:

$$S_u^N : u[n] \to u'[n]$$

$$u'[n] = \begin{cases} u\left[\frac{n_1}{N}\right], & \text{when } n_i \in n\frac{n_i}{N} \in Z \\ 0 \end{cases};$$

where Z is a time-shift operator. The velocity controller is configured to output a current signal. The current signal is configured to be superimposed on the first sampling error compensation and transmitted to the second holder. The second holder is configured to drive the motor to rotate and then drive the mechanical transmission module to move, such that the mechanical transmission module drives the sliding table of the NC machine tool to move to output an actual displacement of the sliding table of the NC machine tool.

Referring to FIG. 2, the error compensation system of the NC machine tool, before output a position feedback to the position controller, to form a position loop. The motor and the mechanical transmission module, as the control plant, output velocity feedback to the velocity controller to form a velocity loop. Based on the multi-sampling rate architecture, the velocity loop is configured to realize the iterative learning control strategy with the first sampling error compensation. The first sampling error compensation is injected to the velocity loop. The error compensation system of the NC machine tool is configured to enhance the characteristics of different frequencies. The multi-sampling rate architecture is realized based on the original error compensation system of the NC machine tool, and the cost will not increase with the increased error sampling rate. The enhancement of the control precision is enabled based on the original architecture, which ensures a fast convergence during the iterative learning process.

The second sampling command is expressed as $r_s$. The second sampling command $r_s$ is obtained from the first sampling command $r_f$ by down-sampling through the down-sampling module, and a down-sampling process $S_d^N$ is expressed as:

$$S_d^N : r_f[n] \to r_s[n], r_s[n] = r_f[Nn];$$

where n and N respectively represent a positive integer, and the number of data points of the first sampling command $r_f$ is N times the number of data points of the second sampling command $r_s$. The frequency characteristics of different control loops are strengthened, that is, the position loop and the velocity loop are configured to operate at a slow sampling rate and a fast sampling rate, respectively, according to the actual engineering.

The first sampling error sequence $e_{j-1}$ and the first sampling error compensation sequence $u_{j-1}$ are input to the iterative learning controller, the iterative calculation performed by the iterative learning controller to obtain the first sampling error compensation sequence $u_1$ is performed off line.

The position controller is configured to work at a slow sampling rate corresponding to the second sampling command. An input of the position controller is the difference between the second sampling command $r_s$ and the displacement y of the sliding table of the NC machine tool. The motor of the sliding table of the NC machine tool is equipped with an encoder displacement detecting module. The encoder displacement detecting module is configured to detect an angular displacement of the motor and calculate the corresponding displacement y of the sliding table of the NC machine tool.

In an embodiment, the error compensation system of the NC machine tool further includes a velocity estimator. And the velocity estimator is configured to estimate a real-time velocity of the sliding table of the NC machine tool in real time.

Figure 3:
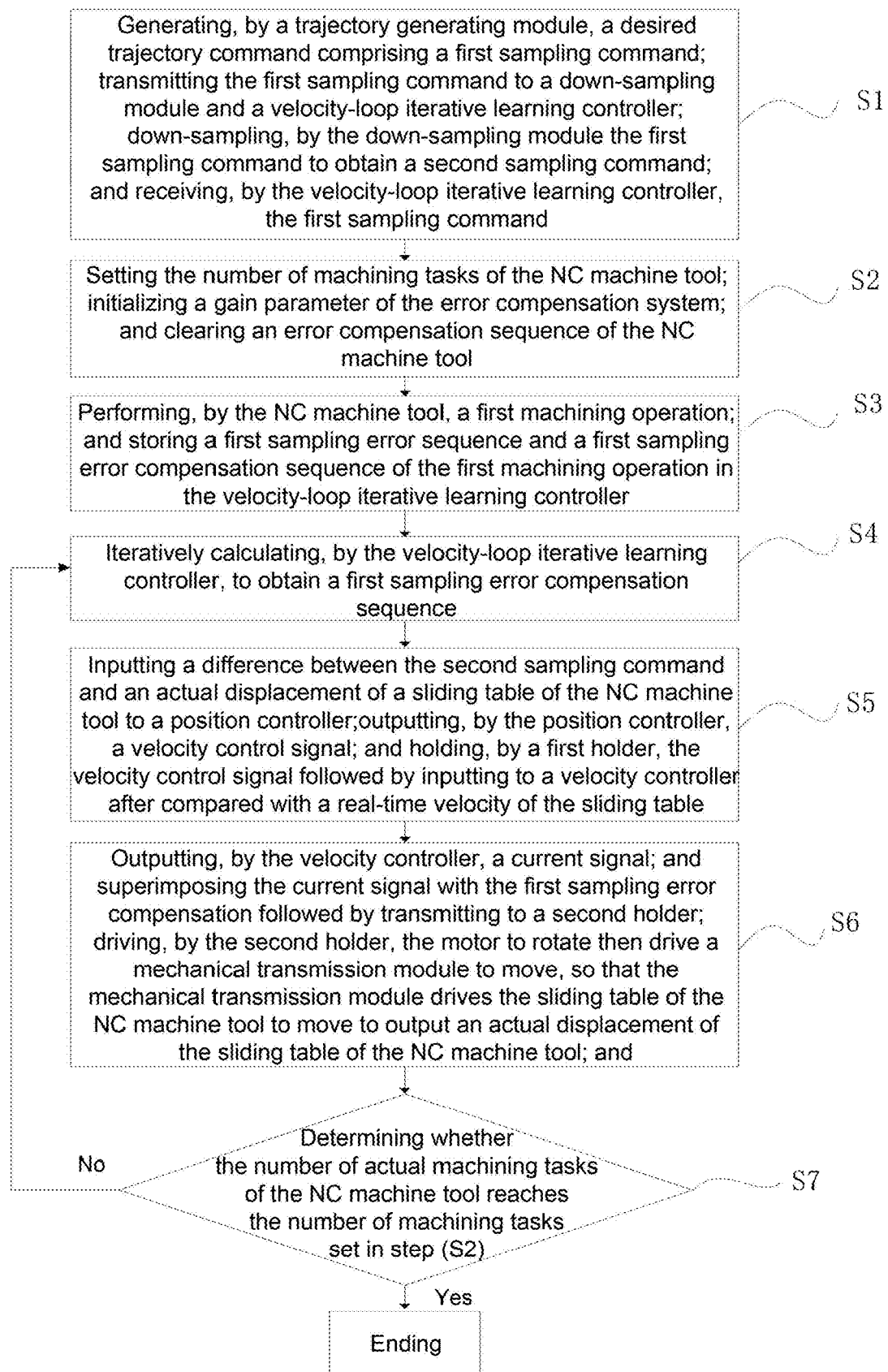
FIG. 3 is a flowchart of a fast error compensation method for the NC machine tool based on iterative learning control according to an embodiment of the present disclosure.

An error compensation method based on the error compensation system is structurally illustrated in FIG. 3. The error compensation method is performed as follows.

(S1) A desired trajectory command is generated by a trajectory generating module. The desired trajectory command includes a first sampling command and a second sampling command. The first sampling command is configured to be transmitted to a down-sampling module and a velocity-loop iterative learning controller respectively. The first sampling command $r_f$ is down-sampled by the down-sampling module to obtain a second sampling command $r_s$. The velocity-loop iterative learning controller is configured to receive the first sampling command $r_f$.

(S2) The number of machining tasks of the NC machine tool is set. A gain parameter of the error compensation system of the NC machine tool is initialized. An error compensation of the NC machine tool is cleared.

(S3) A first machining operation is performed by the NC machine tool. A first sampling error sequence and a first sampling error compensation sequence of the first machining operation are stored in the velocity-loop iterative learning controller.

(S4) A first sampling error compensation is iteratively calculated by the velocity-loop iterative learning controller.

(S5) A difference between the second sampling command and an actual displacement of a sliding table of the NC machine tool is input to a position controller. A velocity control signal is output by the position controller. The velocity control signal is held by a first holder, and input to a velocity controller after compared with a real-time velocity of the sliding table of the NC machine tool.

(S6) A current signal is output by the velocity controller. The current signal is superimposed on the first sampling error compensation and input to a second holder. The second holder is configured to drive the motor to rotate and then drive a mechanical transmission module to move, so that the mechanical transmission module drives the sliding table of the NC machine tool to move to output an actual displacement of the sliding table of the NC machine tool.

(S7) Whether the number of actual machining tasks of the NC machine tool reaches the number of machining tasks set in step (S2) is determined, if yes, the error compensation control is ended; otherwise, steps (S4)-(S6) are repeated.

In an embodiment, the error compensation method is realized based on the error compensation system of the NC machine tool. The error compensation method is applied to a repetitive machining operation of the NC machine tool when the error compensation system of the NC machine tool has been constituted, and a position error signal at high sampling rate is obtained under a multi-sampling rate architecture to perform a fast error compensation at high sampling rate, avoiding the problem that the slow error compensation solved by the traditional position-loop iterative learning control method is only a sub-optimal solution, which is beneficial to improve a control precision of the NC machine tool.

The low-pass filtering process is performed with an IIR-type low-pass filter using a non-causal method through the following steps. Items in a bracket of equation (1) are filtered, and a filtering result is reversed and filtered again, and a filtering result is reversed to obtain a result of an entire low-pass filtering to reduce an effect of phase delay.

Figure 4:
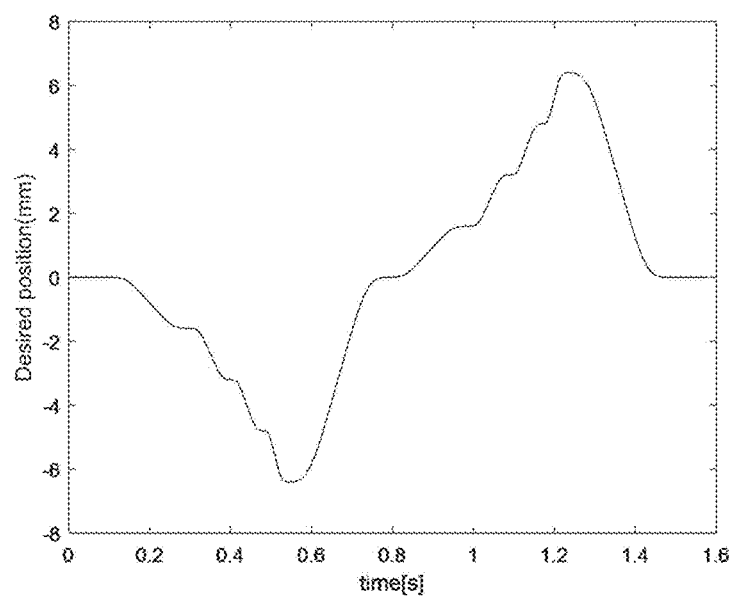
FIG. 4 shows a desired trajectory generated by a trajectory generating module according to an embodiment of the present disclosure.
Figure 5:
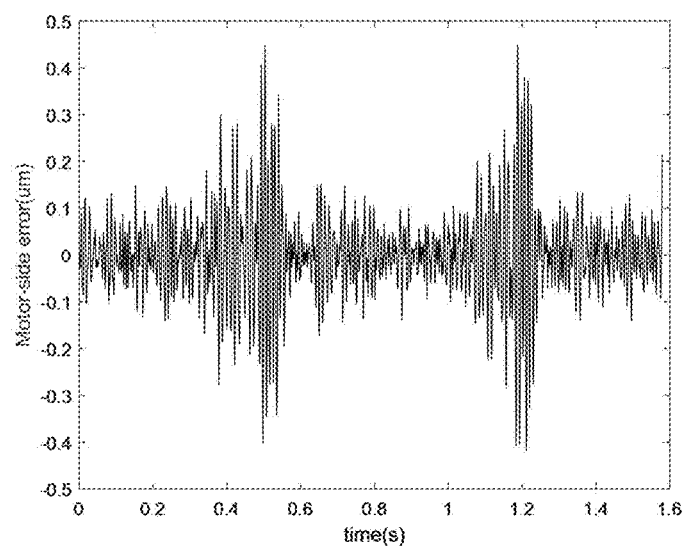
FIG. 5 schematically shows an error compensation result of a conventional slow iterative learning control (10 iterations) for a trajectory tracking process in a Matlab/Simulink environment according to an embodiment of the present disclosure.
Figure 6:
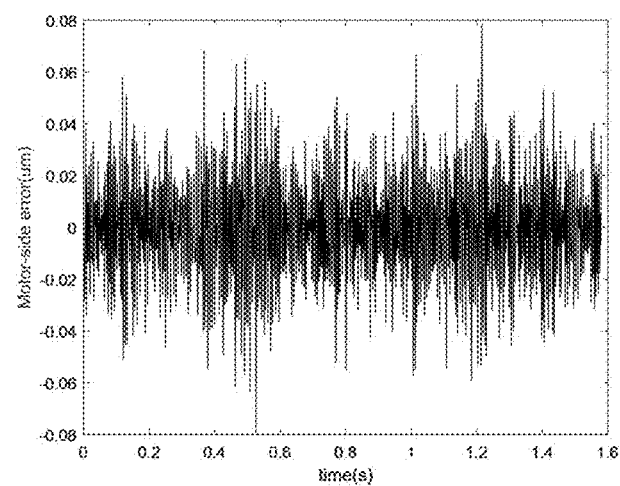
FIG. 6 schematically shows an error compensation result of a conventional fast iterative learning control (10 iterations) for the trajectory tracking process in the Matlab/Simulink environment according to an embodiment of the present disclosure.

The following takes the trajectory tracking process under the Matlab/Simulink environment and the trajectory tracking process of the actual XY sliding table as examples to further illustrate the effectiveness of the error compensation system of the NC machine tool and the error compensation method of NC machine tool provided in the present disclosure, FIG. 4 is the desired trajectory diagram generated by the trajectory generation module under two cases (position loop iterative learning controller and velocity loop iterative learning controller) for comparison, where the horizontal coordinates represents time and the vertical coordinates represents discrete positions. The curve in FIG. 4 is a combination of step trajectories. The step trajectory is planned by S-curve, and the motor and mechanical transmission model are the control plants of the error compensation system of the NC machine tool. The linear model is identified by using the identification method in the NC machine tool error compensation system. The parameters of the velocity loop controller and the position loop controller are tuned by Matlab control toolbox, and the sampling rate of the position controller is 1000 Hz, and the sampling rate of the velocity controller is 4000 Hz, iterative learning control strategies of slow error compensation in position loop and fast error compensation in velocity loop are realized respectively, and operate continuously for 10 iterations for comparison. The compensation injection point of the slow error compensation is located in the position loop, and the compensation injection point of the fast error compensation is located in the velocity loop. The performances of the two methods are compared, where FIG. 5 shows the error compensation result diagram of slow iterative learning control (10 iterations), and FIG. 6 shows the error compensation result diagram of fast iterative learning control (10 iterations). Under the condition of interference and measurement error, it can be seen from the results of the 10th iteration that both iterative learning controllers can improve the trajectory tracking accuracy of the sliding table of the NC machine tool, but the final error result of the fast error compensation method is obviously better than the slow error compensation method. The fast error compensation method can reach the order of magnitude in 1e-2 under the simulation scenario, and the slow error compensation method can only reach the order of magnitude in 1e-1.

Figure 7:
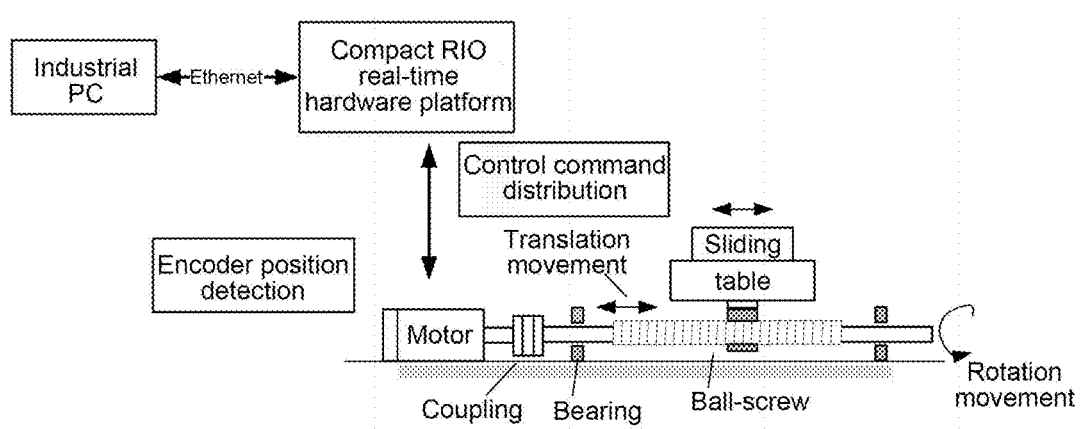
FIG. 7 schematically shows an actual hardware structure of the NC machine tool when the trajectory tracking is performed in an actual XY sliding table according to an embodiment of the present disclosure.
Figure 8:
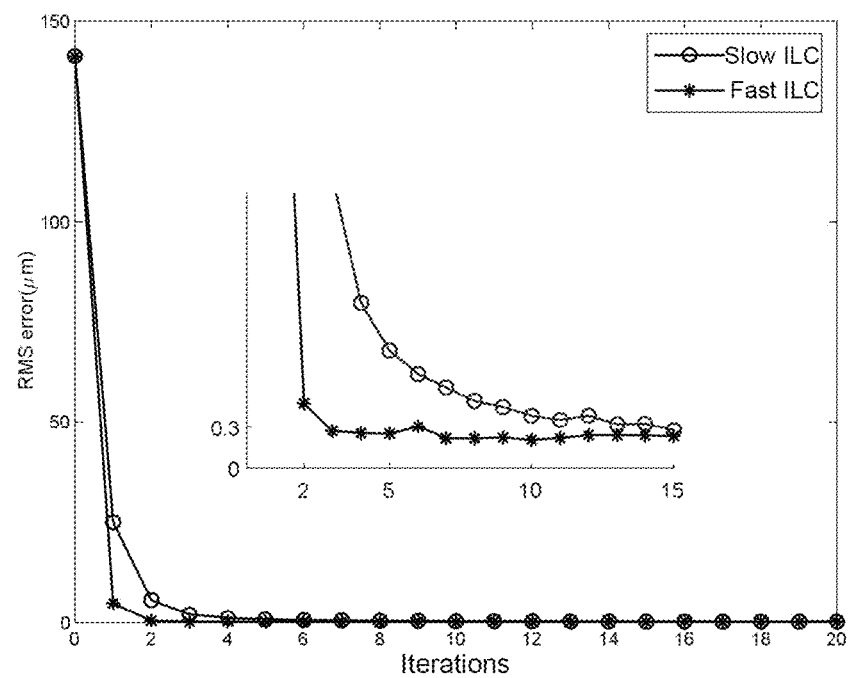
FIG. 8 schematically shows an error convergence of a fast iterative learning control (fast ILC, 10 iterations) and a slow iterative learning control (slow ILC, 10 iterations) when the trajectory tracking is performed in the actual XY sliding table according to an embodiment of the present disclosure.

Secondly, the trajectory tracking is performed in the actual XY sliding table. FIG. 7 shows the actual hardware structure of the NC machine tool in the process. The parameters of the position controller and the velocity controller are the same with the simulation in the Matlab/Simulink environment. The controller is implemented in the sliding table of the NI CompactRIO real-time hardware. The collected error data and compensation data are transmitted to the host PC machine via Ethernet, and calculated by MATLAB according to the error compensation method of the present disclosure to obtain the error compensation sequences $u_j$ for the next iteration process. NI CompactRIO is to control the sliding table of XY in real time with the error compensation sequences $u_j$, and the root mean square error (RMSE) performance index is introduced to evaluate the trajectory tracking results. Two error convergence processes of the two different methods can be obtained by fast iterative learning control and slow iterative learning control. As shown in FIG. 8, the vertical coordinate represents the RMSE, and the horizontal coordinate represents the number of iterations. The trajectory tracking error of each of iteration results is calculated to obtain the RMSE value, where "○" represents the slow ILC method, and "*" represents the fast ILC method, it can be seen that the fast error compensation method has a faster convergence speed and can obtain the better control precision.

Figure 9:
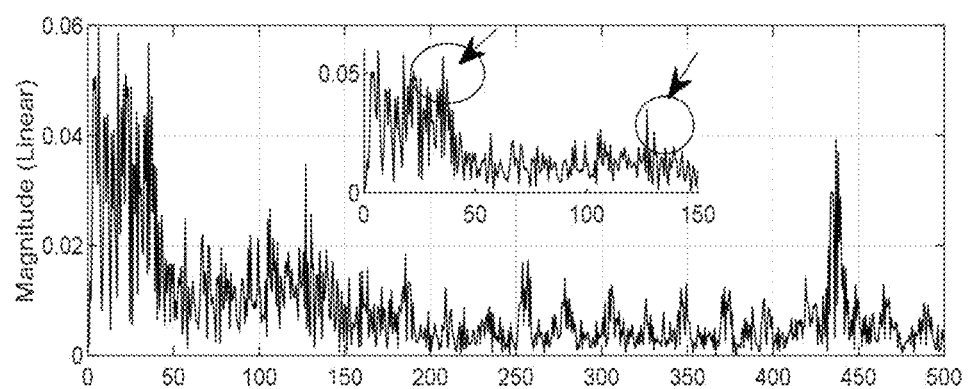
FIG. 9 is a frequency spectrum diagram of error results of a slow iterative learning control (slow ILC, 10 iterations) at a sampling rate of 1000 Hz when the trajectory tracking is performed in the actual XY sliding table according to an embodiment of the present disclosure.
Figure 10:
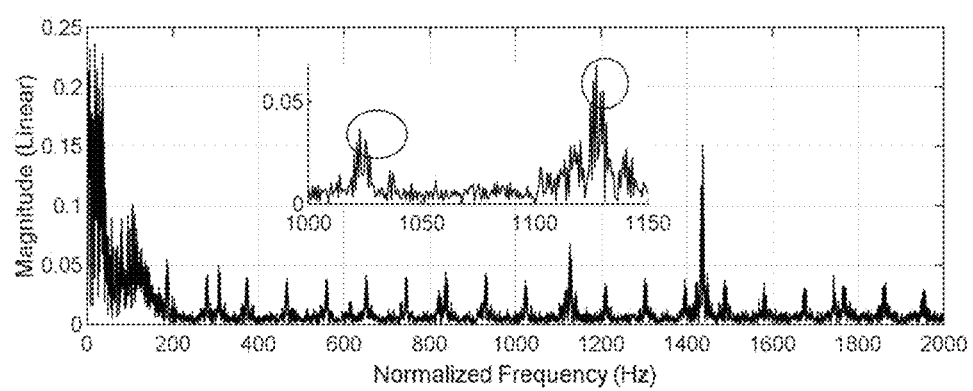
FIG. 10 is a frequency spectrum diagram of error results of the slow iterative learning control (slow ILC, 10 iterations) at a sampling rate of 4000 Hz when the trajectory tracking is performed in the actual XY sliding table according to an embodiment of the present disclosure.
Figure 11:
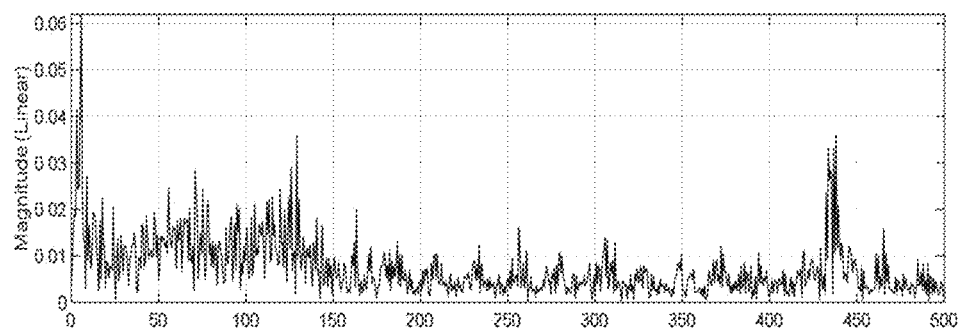
FIG. 11 shows a frequency spectrum of error results of a fast iterative learning control (fast ILC, 10 iterations) at a sampling rate of 1000 Hz when the trajectory tracking is performed in the actual XY sliding table according to an embodiment of the present disclosure.
Figure 12:
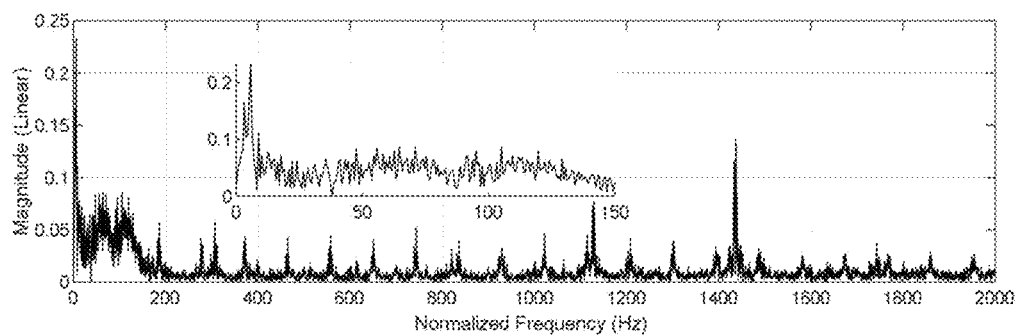
FIG. 12 shows a frequency spectrum of error results of the fast iterative learning control (fast ILC, 10 iterations) at a sampling rate of 4000 Hz when the trajectory tracking is performed in the actual XY sliding table according to an embodiment of the present disclosure.

FIGS. 9-10 show the frequency spectrum of the error results of the slow iterative learning control (slow ILC, 10 iterations) when the trajectory tracking is performed by the actual XY sliding table. FIGS. 11-12 show the frequency spectrum of the error results of fast iterative learning control (fast ILC, 10 iterations) when the trajectory tracking is performed by the actual XY sliding table. Among which, the sampling rate in FIG. 9 and FIG. 11 is 1000 Hz, and the sampling rate in FIG. 10 and FIG. 12 is 4000 Hz. The error spectrum of the final convergence result of the two methods is further analyzed, because in the slow ILC process, only the 1000 Hz error result is sampled for learning, which causes the high-frequency components to alias to the low-frequency part, which causes the low-frequency component of the error distorted, and finally makes the slow ILC unable to perform learning compensation correction for some error information. In contrast, the fast ILC can avoid this problem according to the error spectrum results shown in FIGS. 11-12, which fundamentally explains the superiority of the fast ILC method. The fast ILC method has a higher position accuracy for the learning convergence process compared to the slow ILC method. The fast ILC method designed by the present disclosure is implemented in the velocity loop of the error compensation system for a multi-sampling rate NC machine tool, which solves the problems of time-consuming convergence process and low precision in the traditional slow ILC method implemented in the position loop, enhancing the machining efficiency and precision of the NC machine tool.

The positional relationship indicated in the drawings are merely for exemplary illustration, and should not be construed as a limitation to this application.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:
1. An error compensation system for a numerical control (NC) machine tool based on iterative learning control, comprising:
a trajectory generating module;
a down-sampling module;
a position controller;
a first holder;
a velocity-loop iterative learning controller;
a velocity controller;
a second holder; and
a control plant;
wherein the control plant comprises a motor and a mechanical transmission module; the trajectory generating module is configured to generate a desired trajectory command; the desired trajectory command comprises a first sampling command; the first sampling command is configured to be transmitted to the down-sampling module and the velocity-loop iterative learning controller; the first sampling command $r_f$ is down-sampled by the down-sampling module to obtain a second sampling command $r_s$; a sampling rate of the first sampling command is larger than a sampling rate of the second sampling command; the velocity-loop iterative learning controller is configured to receive the first sampling command; the velocity-loop iterative learning controller is also configured to obtain a first sampling error compensation sequence according to a first sampling error sequence and a first sampling error compensation sequence of a previous iteration machining process stored in the velocity-loop iterative learning controller; the velocity-loop iterative learning controller comprises a memory and an iterative learning controller; the first sampling error sequence of the previous iteration machining process of the NC machine tool is expressed as $e_{j-1}$; the first sampling command is expressed as $r_f$; the first sampling error sequence $e_{j-1}$ of previous iteration is a difference between the first sampling command $r_f$ and a displacement y of a sliding table of the NC machine tool; the first sampling error compensation sequence of the previous iteration is expressed as $u_{j-1}$; the memory is configured to store the first sampling error sequence $e_{j-1}$ and the first sampling error compensation sequence $u_{j-1}$ of the previous iteration machining process; after the first sampling error sequence $e_{j-1}$ and the first sampling error compensation sequence $u_{j-1}$ are input to the iterative learning controller, the iterative learning controller is configured to obtain the first sampling error compensation sequence $u_j$ through iterative calculation using a proportional-derivative (PD) method, expressed as:

$$u_j = Q\left(u_{j-1} + \Gamma_p e_{j-1} + \Gamma_d \frac{de_{j-1}}{dt}\right); \tag{1}$$

wherein j is the number of iterations; $\Gamma_p$ and $\Gamma_d$ respectively represent an iterative learning gain; Q represents a low-pass filtering process; $e_{j-1}$ is the first sampling error sequence; the position controller is configured to receive a difference between the second sampling command output by the down-sampling module and the displacement y of the sliding table of the NC machine tool, and output a velocity control signal, and the velocity control signal is held by the first holder, and input to the velocity controller after compared with real-time velocity of the sliding table of the NC machine tool; a mathematical realization expression of the first holder is shown as follows:

$$H_u = H^N S_u^N;$$

wherein $H^N$ represents the second holder, which is configured as a zero-order holder; $S_u^N$ represents an up-sampling process; and the zero-order holder is expressed as:

$$H^N = \sum_{f=0}^{N} z^{-f};$$

the up-sampling process $S_u^N$ is expressed as:

$$S_u^N: u[n] \to u'[n]$$

$$u'[n] = \begin{cases} u\left[\dfrac{n_1}{N}\right], & \text{when } n_i \in n\dfrac{n_i}{N} \in Z \\ 0 \end{cases};$$

wherein Z is a time-shift operator; the velocity controller is configured to output a current signal; the current signal is configured to be superimposed on the first sampling error compensation sequence and transmitted to the second holder; the second holder is configured to drive the motor to rotate to drive the mechanical transmission module to move, such that the mechanical transmission module drives the sliding table of the NC machine tool to move to output an actual displacement y of the sliding table of the NC machine tool.

2. The error compensation system of claim 1, wherein the second sampling command is expressed as $r_s$; the second sampling command $r_s$ is obtained from the first sampling command $r_f$ by down-sampling through the down-sampling module, and a down-sampling process $S_d^N$ is expressed as:

$$S_d^N: r_f[n] \to r_s[n], r_s[n] = r_f[Nn];$$

wherein n and N respectively represent a positive integer, and the number of data points of the first sampling command $r_f$ is N times the number of data points of the second sampling command $r_s$.

3. The error compensation system of claim 2, wherein after the first sampling error sequence $e_{j-1}$ and the first sampling error compensation sequence $u_{j-1}$ of the previous iteration are input to the iterative learning controller, the iterative calculation performed by the iterative learning controller to obtain the first sampling error compensation $u_j$ of current iteration is performed off line.

4. The error compensation system of claim 3, wherein the position controller is configured to work at a sampling rate corresponding to the second sampling command; an input of the position controller is the difference between the second sampling command $r_s$ and the displacement y of the sliding table of the NC machine tool; the motor of the sliding table of the NC machine tool is equipped with an encoder displacement detecting module; and the encoder displacement detecting module is configured to detect an angular displacement of the motor and calculate the corresponding displacement y of the sliding table of the NC machine tool.

5. The error compensation system of claim 4, further comprising:
a velocity estimator;
wherein the velocity estimator is configured to estimating a velocity of the sliding table of the NC machine tool in real time.

6. An error compensation method based on the error compensation system of claim 1, comprising:
(S1) generating, by a trajectory generating module, a desired trajectory command comprising a first sampling command;
transmitting the first sampling command to a down-sampling module and a velocity-loop iterative learning controller;
down-sampling, by the down-sampling module, the first sampling command to obtain a second sampling command; and
receiving, by the velocity-loop iterative learning controller, the first sampling command;
(S2) setting the number of machining tasks of the NC machine tool;
initializing a gain parameter of the error compensation system; and
clearing an error compensation sequence of the NC machine tool;
(S3) allowing the NC machine tool to perform a first machining operation; and
storing a first sampling error sequence and a first sampling error compensation sequence of the first machining operation in the velocity-loop iterative learning controller;
(S4) iteratively calculating, by the velocity-loop iterative learning controller, to obtain a first sampling error compensation sequence;
(S5) inputting a difference between the second sampling command and an actual displacement of a sliding table of the NC machine tool to a position controller;
outputting, by the position controller, a velocity control signal; and
holding, by a first holder, the velocity control signal followed by inputting to a velocity controller after compared with a real-time velocity of the sliding table of the NC machine tool;
(S6) outputting, by the velocity controller, a current signal;
superimposing the current signal with the first sampling error compensation followed by transmitting to a second holder; and
driving, by the second holder, a motor to rotate and then drive a mechanical transmission module to move, so that the mechanical transmission module drives the sliding table of the NC machine tool to move to output an actual displacement of the sliding table of the NC machine tool; and
(S7) determining whether the number of actual machining tasks of the NC machine tool reaches the number of machining tasks set in step (S2);
if yes, ending;
otherwise, returning to step (S4).

7. The error compensation method of claim 6, wherein the low-pass filtering process is performed with an IIR-type low-pass filter using a non-causal method through steps of;
filtering items in a bracket of equation (1);
reversing a filtering result followed by another filtering; and
reversing a filtering result to obtain a result of an entire low-pass filtering process.

* * * * *